(12) United States Patent
Drees et al.

(10) Patent No.: US 9,763,542 B2
(45) Date of Patent: Sep. 19, 2017

(54) ANTI-ROTATIONAL LATCH FOR A BLENDING APPLIANCE

(71) Applicant: Whirlpool Corporation, Benton Harbor, MI (US)

(72) Inventors: Steve C. Drees, Stevensville, MI (US); Paul S. Paget, Kalamazoo, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 833 days.

(21) Appl. No.: 14/208,234

(22) Filed: Mar. 13, 2014

(65) Prior Publication Data

US 2015/0257601 A1    Sep. 17, 2015

(51) Int. Cl.
*A47J 43/046* (2006.01)
*A47J 43/07* (2006.01)

(52) U.S. Cl.
CPC ......... *A47J 43/0465* (2013.01); *A47J 43/046* (2013.01); *A47J 43/0766* (2013.01)

(58) Field of Classification Search
CPC ... A47J 43/0465; A47J 43/046; A47J 43/0766
See application file for complete search history.

(56) References Cited

U.S. PATENT DOCUMENTS

| | | |
|---|---|---|
| 4,174,073 A | 11/1979 | Maher et al. |
| 4,653,519 A | 3/1987 | Kanner |
| 5,486,050 A | 1/1996 | Lenting |
| 5,524,530 A | 6/1996 | Nijzingh et al. |
| 6,095,677 A | 8/2000 | Karkos, Jr. et al. |
| 6,189,441 B1 | 2/2001 | Beaudet et al. |
| 6,210,033 B1 | 4/2001 | Karkos, Jr. et al. |
| 6,336,603 B1 | 1/2002 | Karkos, Jr. et al. |
| 6,632,013 B2 | 10/2003 | Wulf et al. |
| 6,748,853 B1 | 6/2004 | Brady et al. |
| 6,793,167 B2 | 9/2004 | Karkos, Jr. et al. |
| 6,889,924 B2 | 5/2005 | Pavlovic et al. |
| 7,993,054 B2 | 8/2011 | Wulf et al. |
| 8,042,990 B2 | 10/2011 | Pryor et al. |
| 8,109,668 B2 | 2/2012 | Garman et al. |
| 2001/0002892 A1 | 6/2001 | Karkos, Jr. et al. |

*Primary Examiner* — Mark Rosenbaum
(74) *Attorney, Agent, or Firm* — Price Heneveld LLP

(57) ABSTRACT

A jar retainer mechanism for a blending appliance includes an articulating arm pivotally coupled to a housing of the blending appliance. The articulating arm is operable between engaged and disengaged positions and includes a latch member disposed on a first end of the articulating arm. The latch member is configured to engage an engagement tab disposed on a blender jar when the articulating arm is in the engaged position and the blender jar is received laterally in a jar receiving portion. A push member is disposed on a second end of the articulating arm and is configured to displace the blender jar when the articulating arm is moved towards the disengaged position.

19 Claims, 9 Drawing Sheets

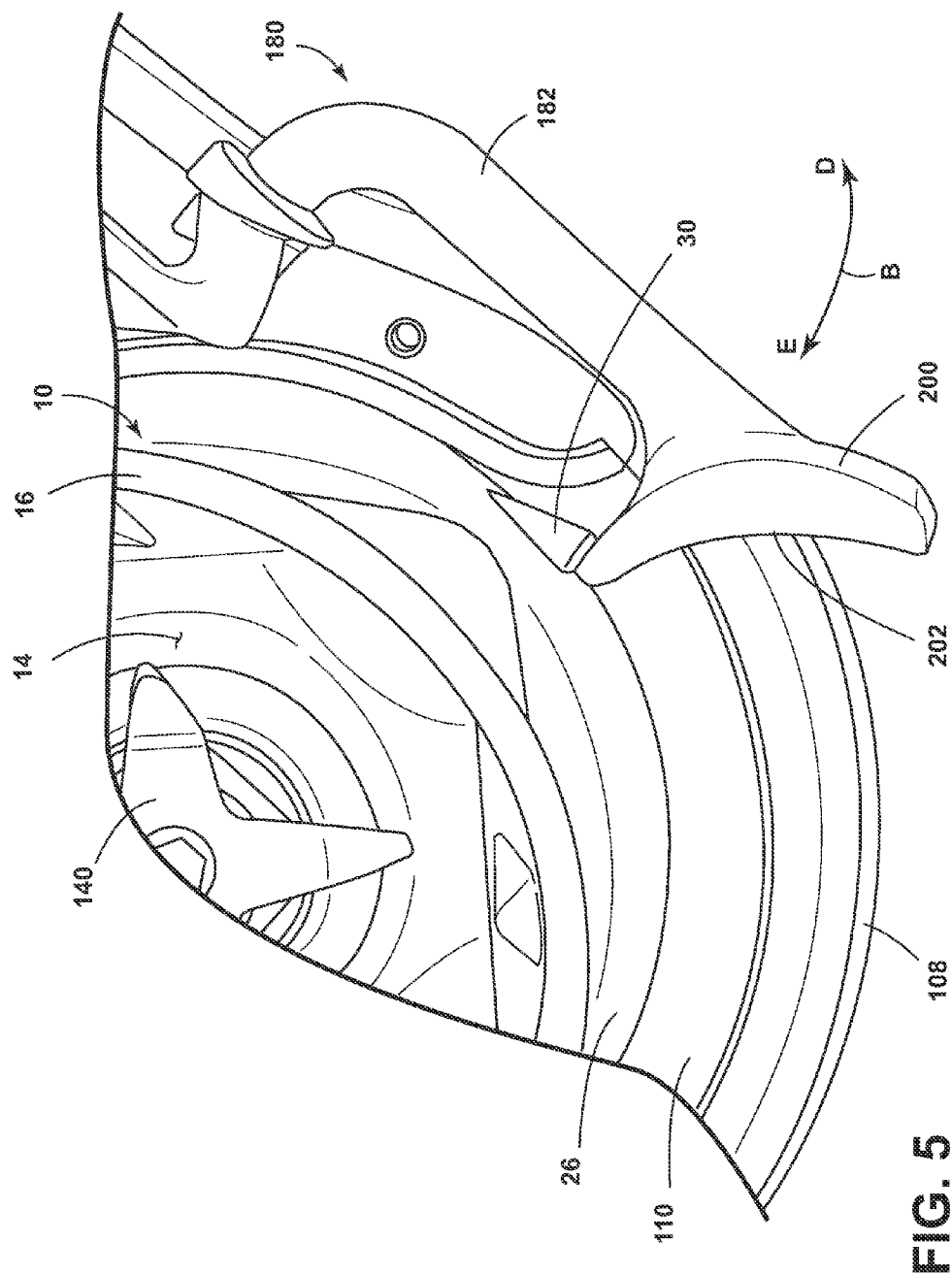

ANTI-ROTATIONAL LATCH FOR A BLENDING APPLIANCE

BACKGROUND

The present concept generally relates to a blending appliance, and more particularly to a blending appliance having a magnetic coupler system and an anti-rotational latch mechanism retaining a blender jar on a housing of the blending appliance.

SUMMARY

One aspect of the present concept includes a jar retainer mechanism for a blending appliance, wherein the blending appliance includes a housing having an upper housing member and a base portion with a jar receiving portion defined therebetween. A blender jar is configured to be laterally received in the jar receiving portion and includes an engagement tab disposed on a base portion of the blender jar. An articulating arm is coupled to the base portion of the housing and is operable between engaged and disengaged positions. The articulating arm includes a latch member configured to engage the engagement tab of the blender jar when the articulating arm is in the engaged position and the blender jar is received in the jar receiving portion.

Another aspect of the present concept includes a jar retainer mechanism for a blending appliance having an articulating arm pivotally coupled to a housing of the blending appliance. The articulating arm is operable between engaged and disengaged positions and includes a latch member disposed on a first end of the articulating arm. The latch member is configured to engage an engagement tab disposed on the blender jar when the articulating arm is in the engaged position and the blender jar is received laterally in the jar receiving portion. A push member is disposed on a second end of the articulating arm and is configured to displace the blender jar when the articulating arm is moved towards the disengaged position.

Yet another aspect of the present concept includes a jar retainer mechanism for a blending appliance, wherein the blending appliance includes a housing having an upper housing member and a base portion with a jar receiving portion defined therebetween. A blender jar having a base portion with an outwardly extending engagement tab is configured to be laterally received in the jar receiving portion of the housing. An articulating arm is coupled to the base portion of the housing and is operable between engaged and disengaged positions. The articulating arm includes a latch member configured to engage the engagement tab of the blender jar when the articulating arm is in the engaged position and the blender jar is received laterally in the jar receiving portion. A magnetic coupling system includes upper and lower magnetic couplers, wherein the upper magnetic coupler is disposed in the base portion of the blender jar and the lower magnetic coupler is disposed in the base portion of the housing.

These and other aspects, objects, and features of the present concept will be understood and appreciated by those skilled in the art upon studying the following specification, claims, and drawings.

BRIEF DESCRIPTION OF THE DRAWINGS

In the drawings:

FIG. 5 is a fragmentary top perspective view of a blender jar with an anti-rotational latch mechanism in a latched position.

DETAILED DESCRIPTION

Figure 1:
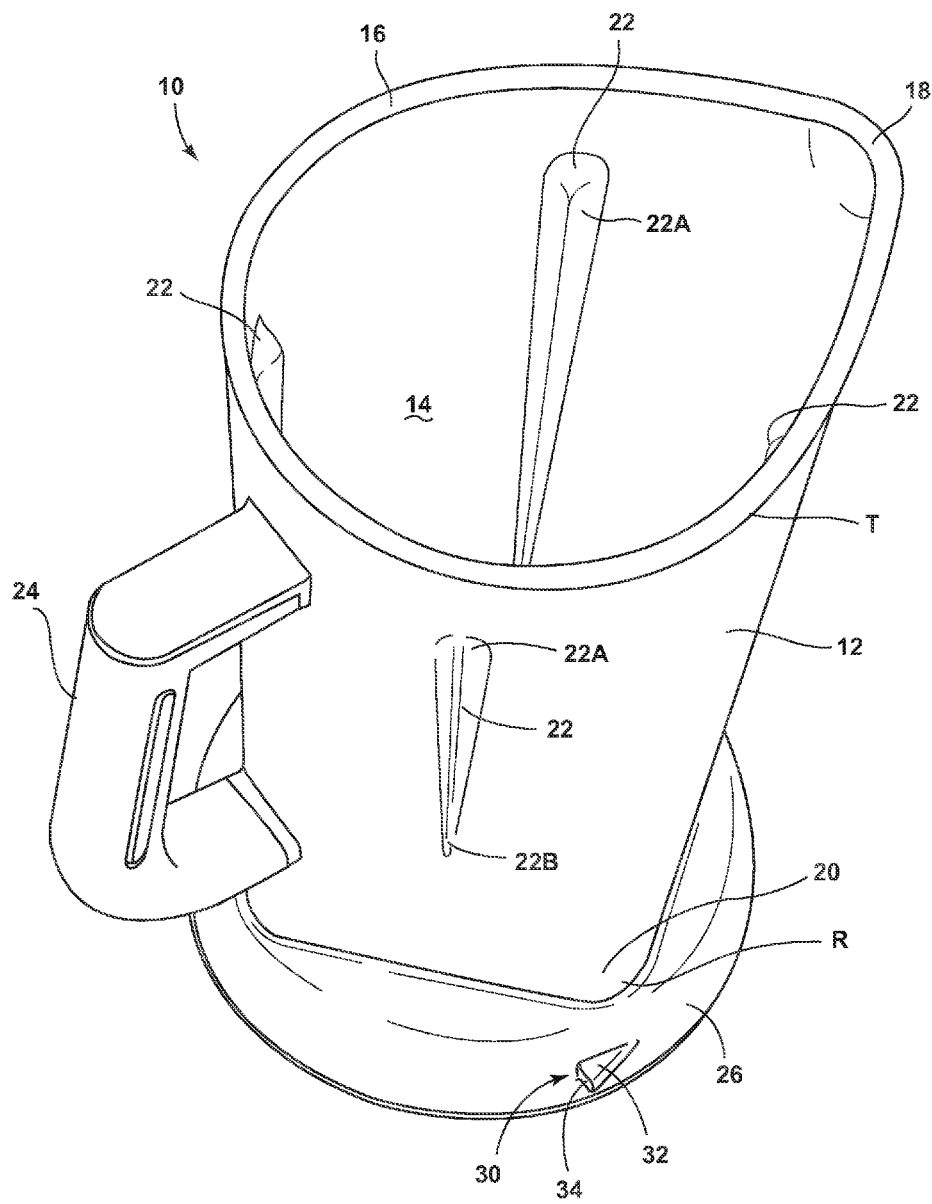
FIG. 1 is a top perspective view of one embodiment of a blender jar of the present concept.

For purposes of description herein, the terms "upper," "lower," "right," "left," "rear," "front," "vertical," "horizontal," and derivatives thereof shall relate to the concept as oriented in FIG. 1. However, it is to be understood that the concept may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates a blender jar having a side wall 12 which generally defines a blending cavity 14 accessible through an open upper end 16. The open upper end 16 includes a spout portion 18 and further has a generally teardrop shaped configuration T. Moving from the open upper end 16 of the blender jar 10 towards a lower portion 20 of the blender jar 10, the configuration of the side wall 12 gradually changes and tapers from the generally teardrop shaped configuration T to a generally rectangular configuration R at the lower portion 20. Thus, the blending cavity 14 has a changing dual configuration from the open upper end 16 to the lower portion 20. The side wall 12 further includes a plurality of ribs 22 which inwardly extend into the blending cavity 14 and taper from an upper portion 22A to a lower portion 22B. The inwardly extending ribs 22, in conjunction with the varied configuration of the blending cavity 14, are adapted to reduce a bridging effect of blender contents during a blending procedure. The inwardly extending ribs 22 along with the configuration of the blending cavity 14 help to fold blender contents into a blending path for subsequent blending by a blade assembly. A handle member 24 extends outwardly from the side wall 12 for engagement by a user. As further shown in FIG. 1, the blender jar 10 includes a jar base 26 which, in the embodiment of FIG. 1, is a generally circular dome shaped base having an engagement tab 30 extending outwardly therefrom. The engagement tab 30 is generally defined by a ramped surface 32 which culminates in a laterally extending abutment surface 34. In use, the engagement tab 30 is adapted to couple to a latch mechanism of a blending appliance as further described below.

Figure 2:
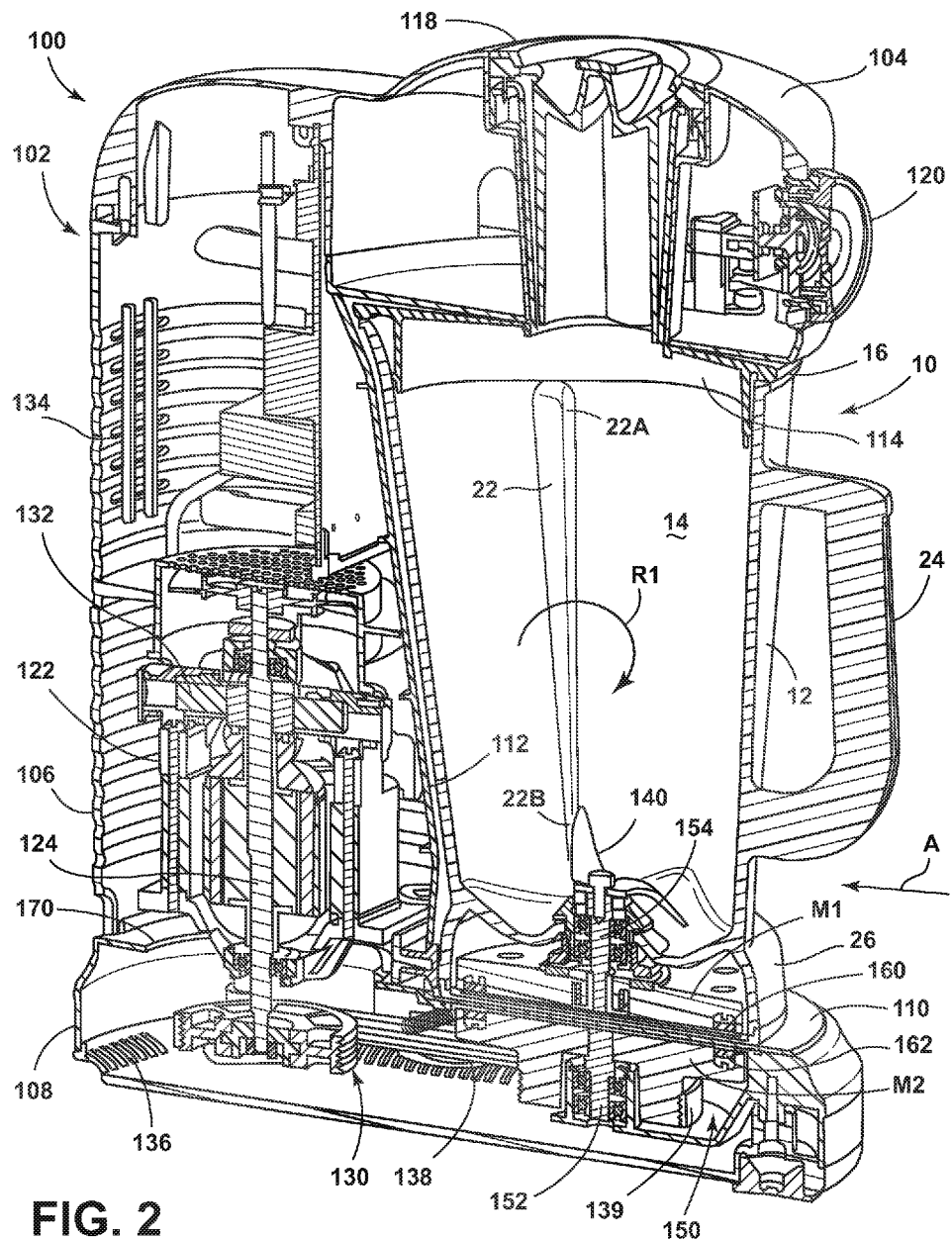
FIG. 2 is a cross-sectional view of a blending appliance having the blender jar of FIG. 1 received therein.

Referring now to FIG. 2, the blender jar 10 is shown being received within a blending appliance 100. The blending appliance 100 includes a housing 102 which comprises an upper housing member 104, a motor compartment 106, and a base portion 108. The upper housing member 104 and base portion 108 generally extend outwardly from the housing 102 above and below the motor compartment 106. The base portion 108 includes a support pad 110 such that a jar receiving portion 112 is defined between the upper housing member 104 and the base portion 108 for receiving the blender jar 10 in a lateral or horizontal manner along a path as indicated by arrow A. Thus, as shown in FIG. 2, the blender jar 10 is laterally received within the jar receiving portion 112 which is adjacent to the motor compartment 106. In this way, the blender jar 10 of the present disclosure is a low profile side drive blender appliance 100 which does not include a conventional stacked configuration of a blender jar over a motor housing and drive motor. In the embodiment shown in FIG. 2, a lid 114 is disposed over the open upper end 16 of the blender jar 10 and includes an aperture 116 which is aligned with a feed chute assembly 118 that is generally disposed through the upper housing member 104. Thus, when the blender jar 10 is horizontally received within the blender jar receiving portion 112, the feed chute assembly 118 is aligned with the aperture 116 of the lid 114 for introducing ingredients into the blender cavity 14. The upper housing member 104 further includes a user interface 120 in the form of a rotary dial which is adapted to control various blending operations of the blending appliance 100.

As further shown in FIG. 2, the blending appliance 100 includes a motor 122 having a drive shaft 124 which is coupled to a belt drive system 130 at a lower end and a ducted fan 132 at an upper end. The ducted fan 132 may also be disposed below the motor 122 and is generally adapted to draw air into and exhaust air out of the housing 102 through vents 134, 136, 138 disposed about the housing 102. The motor 122 is adapted to drive a blade assembly 140 disposed within the blending cavity 14 of the blender jar 10 when the blender jar 10 is fully received within the jar receiving portion 112 of the blending appliance 100. The motor 122 drives the blade assembly 140 through the belt drive system 130 and a magnetic coupling system 150 as further described below. As noted above, a magnetic coupler system 150 is used to drive the blade assembly 140 within the blender cavity 114 as powered by the motor 122. FIG. 2 illustrates a belt drive system 130 which is used to translate torque from the motor 122 to the magnetic coupler system 150. It is contemplated that any number of torque translating features may be used in place of the belt drive system 130, so long as rotational power from the motor 122 is translated to the blade assembly 140. The magnetic coupler system 150 includes an upper magnetic coupler M1 and a lower magnetic coupler M2. The lower magnetic coupler M2 is engaged with a belt 131 of the belt drive system 130 for rotation therewith, as driven by the motor 122.

The lower magnetic coupler M2 is coupled to a shaft 152 and is disposed within the base portion 108 of the blending appliance 100. The lower magnetic coupler M2 is disposed adjacent to the support pad 110 of the jar receiving portion 112. The support pad 110 generally encapsulates the lower magnetic coupler M2 within the base portion 108. The upper magnetic coupler M1 is disposed within the jar base 26 of the blender jar 10. The upper magnetic coupler M1, as coupled to the blender jar 10, is removable from the blending appliance 100 when the blender jar 10 is removed from the jar receiving portion 112. The upper magnetic coupler M1 is coupled to a shaft 154 which is further coupled to the blade assembly 140 which is fully disposed within a receptacle portion or blender cavity 14 of the blender jar 10. The magnetic coupling system 150 magnetically couples the blender jar 10 to the base portion 108 of the blending appliance 100 through magnetic attraction generated between upper and lower magnetic couplers M1, M2. As shown in the embodiment of FIG. 2, the upper and lower magnetic couplers M1, M2, have a generally circular or disc-shaped configuration at a prescribed diameter, such that the blender jar 10 will properly seat on the support pad 110 due to the magnetic forces generated between the upper and lower magnetic couplers M1, M2. In assembly and in use, the motor 122 drives the drive belt drive system 130, as described above, thereby driving the shaft 152 in a direction as indicated by arrow R1. Due to the magnetic attraction and magnetic coupling of the lower magnetic coupler M2 to the upper magnetic coupler M1, the upper magnetic coupler M1 also rotates along the rotational direction as indicated by arrow R1. In this way, the upper and lower magnetic couplers M1, M2 drive the blade assembly 140 disposed within the blender cavity 14 of the blender jar 10 through a magnetic torque coupling, rather than a conventional mechanical coupling.

The upper and lower magnetic couplers M1, M2 may be comprised of a magnetic material or may be in the form of a polymeric housing which includes a plurality of magnetic elements or solid magnetic rings 160, 162 disposed along interfacing surfaces of the upper and lower magnetic couplers M1, M2 respectively.

As described above, the magnetic coupling system 150 of the blending appliance 100 serves to translate torque to the blade assembly 140 without a conventional mechanical coupling between the blade assembly 140 and a gear mechanism operably coupled to the motor 122. Without this mechanical coupling, the blender jar 10 can be horizontally received within the jar receiving portion 112 along a path as indicated by arrow A, as the generally planar lower portion of the base 26 of the jar 10 is adapted to slide unimpeded along the support pad 110 disposed on an upper portion of the base portion 108. The magnetic coupling between the upper and lower coupling mechanisms M1, M2 of the magnetic coupling system 150 may cause the blender jar 10 to move on the planar support pad 110, such that the upper and lower magnetic couplers M1, M2 can become misaligned, thereby disrupting the translation of torque to the blade assembly 140. To counter this effect and resist rotational movement of the blender jar 10, the blending appliance 100 of the present disclosure includes jar retaining mechanisms as further described below.

Figure 3A:
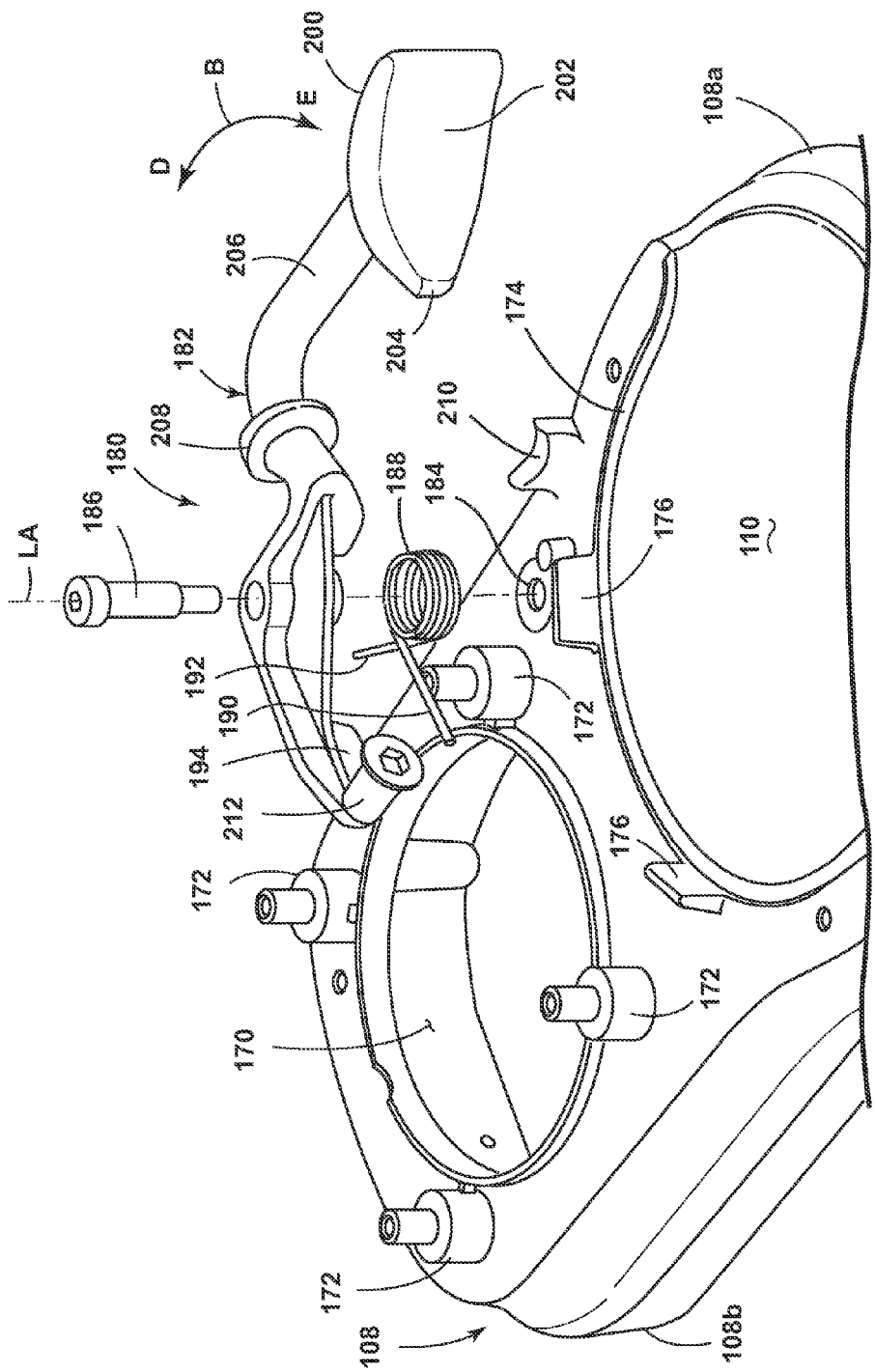
FIG. 3A is a fragmentary top perspective view of a base-portion of a blending appliance having an anti-rotational latch mechanism exploded away.
Figure 3B:
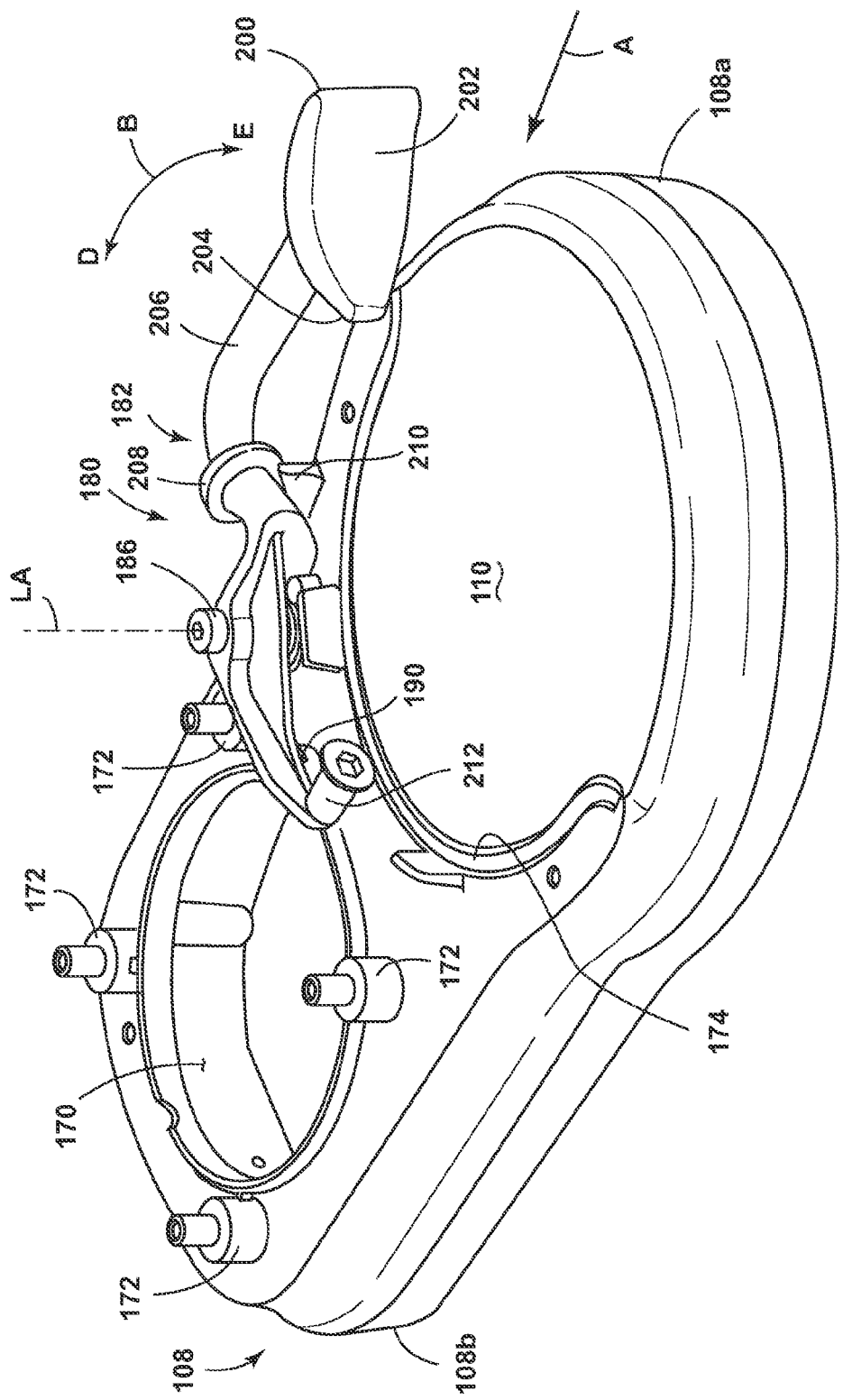
FIG. 3B is a top perspective view of the base portion and anti-rotational latch mechanism of FIG. 3A.
Figure 3C:
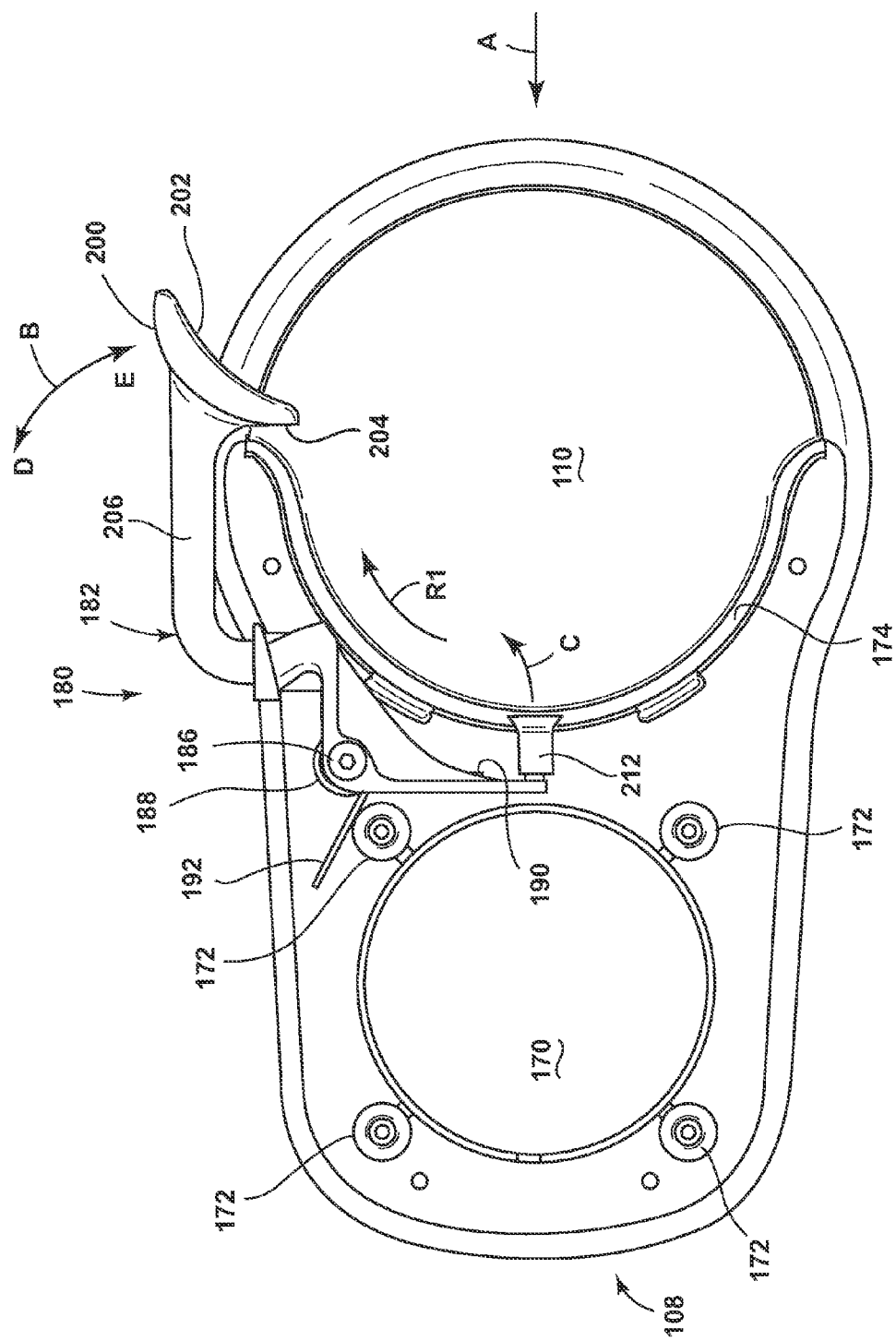
FIG. 3C is a top plan view of the base portion and anti-rotational latch mechanism of FIG. 3B.

Referring now to FIGS. 3A-3C, the base portion 108 of the blending appliance 100 is shown having a rear portion 108b and a front portion 108a. The rear portion 108b includes an aperture 170 through which the drive shaft 124 of the motor 122 downwardly extends to the belt drive system 130 as shown in FIG. 2. The base portion 108 further includes mounting features 172 disposed about the aperture 170 for coupling the base portion 108 to the motor housing 106, also shown in FIG. 2. The support pad 110 is disposed on an upper portion of the front portion 108a of the base portion 108. The support pad 110 includes a lip 174 which surrounds a rear portion of the support pad 110. The lip 174 further includes raised abutment features 176 which together with the lip 174 serve to properly locate the blender jar 10 as received within the jar receiving portion 112. As shown in FIG. 3A, a jar retainer mechanism 180 includes an articulating arm 182 which is coupled to the base portion 108 at an aperture 184 via a fastener 186. In this way, the articulating arm 182 is adapted to pivot about a latch axis LA between a disengaged position D and an engaged position E along a path as indicated by arrow B. A biasing mechanism 188, shown in the form of a coil spring in FIG. 3A, includes first and second arms 190, 192 which are adapted to engage an abutment portion 194 on the articulating arm 182 and a mounting feature 172 disposed adjacent to aperture 184. In this way, the biasing mechanism 188 biases the articulating arm 182 towards the engaged position E. The articulating arm 182 includes a latch member 200 at a first end having a ramped outer surface 202 and a generally planar abutment surface 204. The latch member 200 is supported on the articulating arm 182 by a latch support portion 206. A locating feature 208 is further disposed on the latch support portion 206 and generally engages a cradle feature 210 disposed on the base member 108 adjacent the lip 174. On an opposite second end of the articulating arm 182 relative to the latch member 200, a push member 212 is disposed which is adapted to push or displace the blender jar 10 outwardly as the latch member 200 and articulating arm 182 are moved to the disengaged position D. Thus, the latch member 200 and the push member 212 are disposed on opposite sides of the latch axis LA, and therefore move in an inverse manner relative to one another away from and towards the blender jar 10 as received on the support pad 110.

Referring now to FIGS. 3B and 3C, the jar retainer mechanism 180 is shown having the articulating arm 182 pivotally coupled to the base portion 108 via fastener 186, such that the articulating arm 182 pivots at the latch axis or pivot point LA. As noted above, with reference to FIG. 2, the blender jar 10 includes a jar base 26. As the blender jar 10 is laterally received on the support pad 110, the jar base 26 of the blender jar 10 will engage the ramped portion 202 of latch member 200, thereby urging the articulating arm 182 towards the disengaged position D. The movement of the articulating arm 182 to the disengaged position D is further advanced by the ramped portion 32 of the engagement tab 30 disposed on the base portion 26 of the blender jar 10 as shown in FIG. 1. As the jar assembly 10 moves further along the path as indicated by arrow A into full engagement with the housing 102 in the jar receiving portion 112, the engagement tab 30 will slide past an innermost portion 205 of the latch member 200, such that the articulating arm 182, as biased by the biasing mechanism 188, will snap-fit into the engaged position E, wherein abutment surface 34 of the engagement tab 30 is positioned to engage abutment portion 204 of the latch member 200 in an abutting relationship. As noted above, the magnetic coupling system 150, shown in FIG. 2, is adapted to rotate the blade assembly 140 in a direction as indicated by arrow R1. Thus, as the contents of the blender jar 10 impart a resistance force on the blade assembly 140 along the rotational path indicated by arrow R1, the blender jar 10 will have a tendency to rotate in the direction as indicated by arrow R1 in FIG. 3C. When this type of rotation of the blender jar 10 occurs, abutment surface 34 of engagement tab 30 will abut generally planar abutment portion 204 of the latch member 200, such that the latch member 200 will retain the blender jar 10 in place for proper torque translation from the magnetic coupling system 150 to the blade assembly 140. As further shown in FIG. 3C, the push member 212 moves along a path as indicated by arrow C as the articulating arm 182 moves to the disengaged position D. In this way, the push member 212 pushes the blender jar 10 outwardly from its fully received position on the support pad 110. In this way, and with reference to FIG. 2, the blender jar 10 is vertically retained in the jar receiving portion 112 by the support pad 110 of the base portion 108 of the housing 102 at a lower end, and further retained by the upper housing member 104 as disposed over the open end 16 and lid 114 of the blender jar 10. This vertical retainment of the blender jar 10 in the jar receiving portion 112 is further aided by the jar retainer mechanism 180, which resists against rotational and lateral movement of the blender jar 10 during a blending procedure.

Figure 4A:
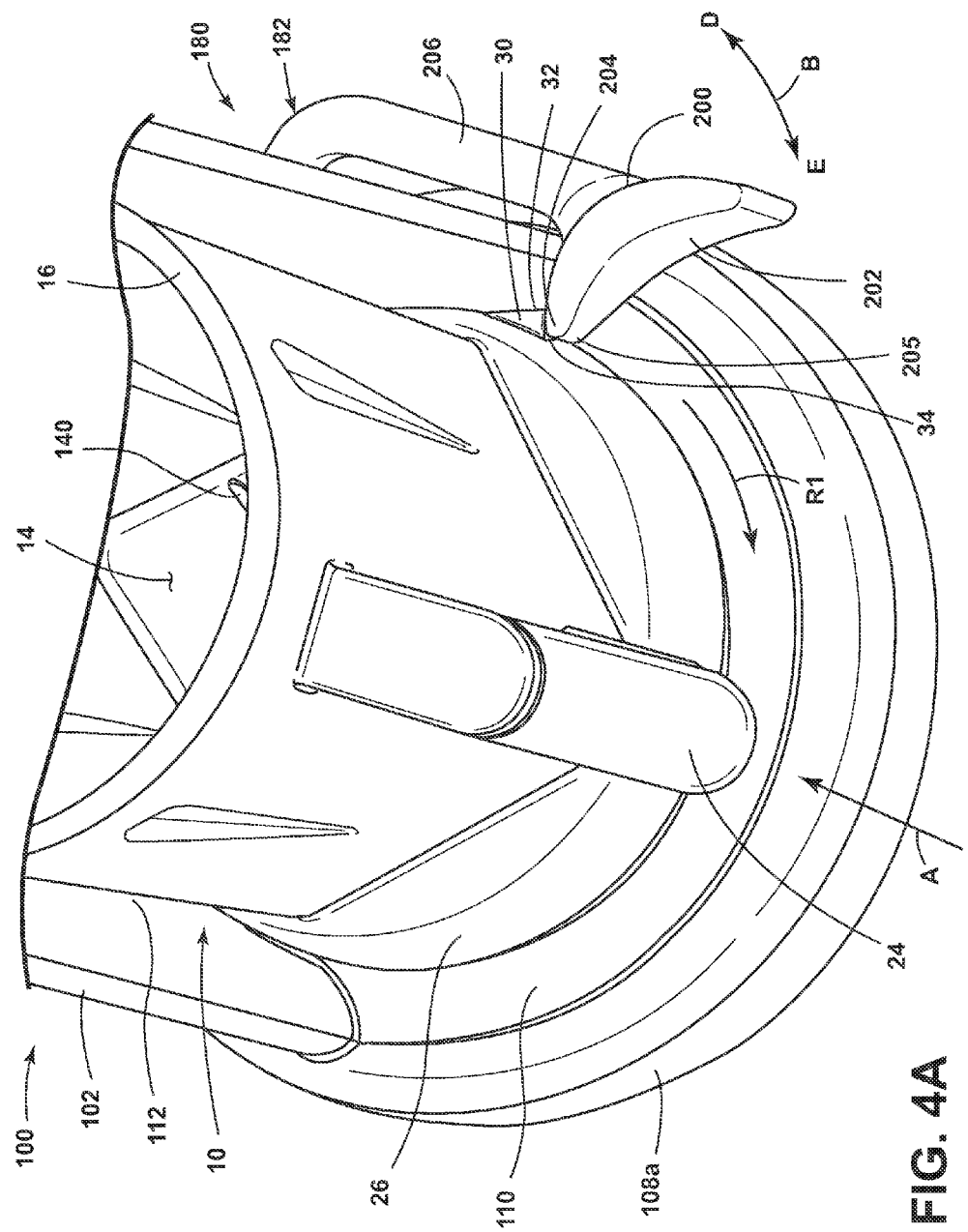
FIG. 4A is a fragmentary top perspective view of the blender jar of FIG. 1 received within the blending appliance with the anti-rotational latch in a latch position.
Figure 4B:
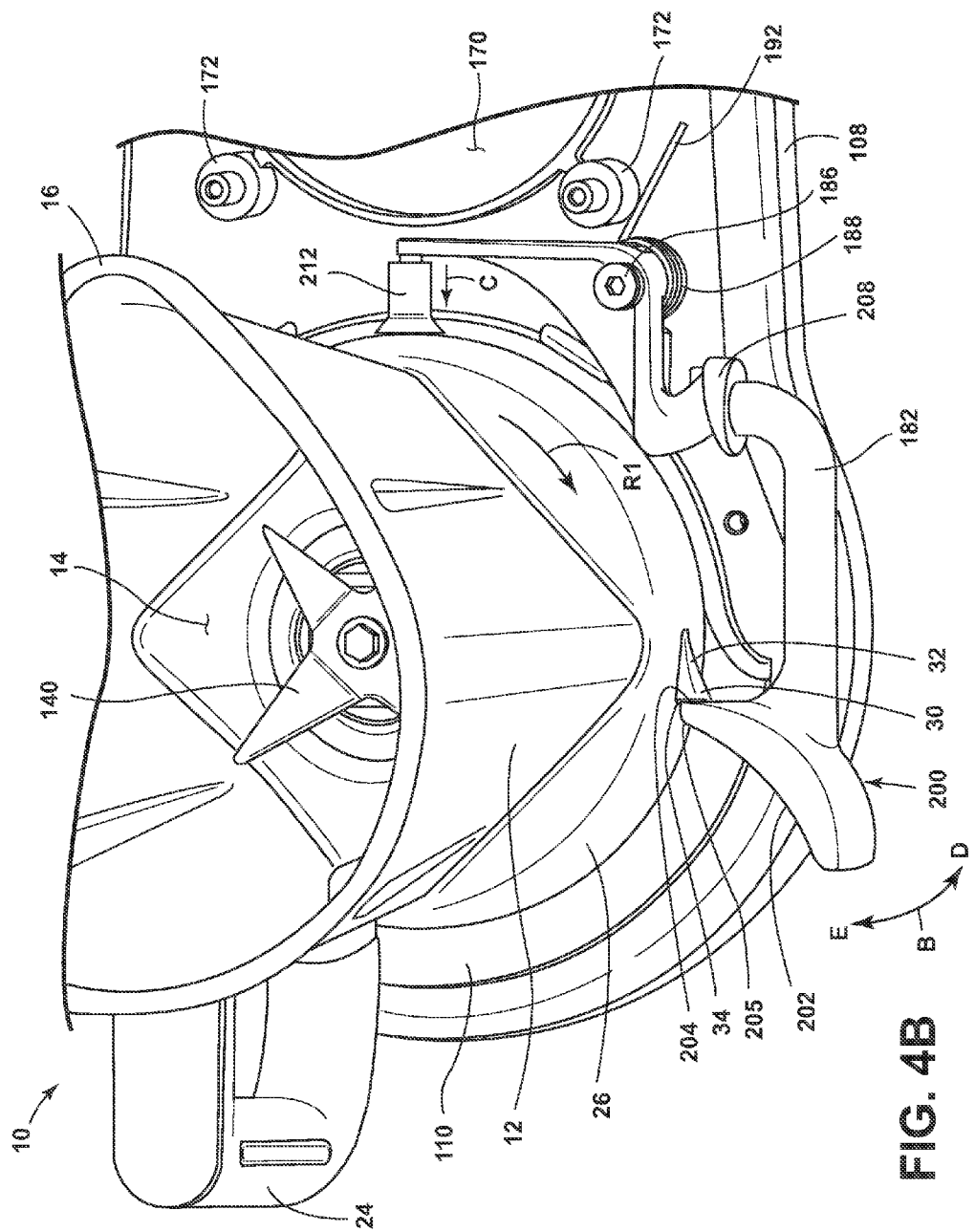
FIG. 4B is a fragmentary top perspective view of the blending appliance of FIG. 4A having a portion of the housing removed.

Referring now to FIGS. 4A and 4B, the blender jar 10 is shown fully received within the blender jar receiving portion 112 of the housing 102 of the blending appliance 100. As properly located for use in a blending procedure on the support pad 110, the blender jar 10 has the engagement tab 30, disposed outwardly from the jar base 26 of the blender jar 10 in engagement with the latch member 200. Specifically, abutment surface 34 of the engagement tab 30 is abuttingly engaged with abutment portion 204 of the latch member 200 when the articulating arm 182 is in the engaged position E. In this way, the jar retainer mechanism 180 retains the jar 10 against rotational forces imparted on the blender jar 10 in a direction as indicated by arrow R1 during a blending procedure. As specifically shown in FIG. 4B, push member 212, disposed on an opposite end of the articulating arm 182 relative to the latch member 200, is in abutting engagement with the jar base 26 of the blender jar 10 when the articulating arm 182 is in the engaged position E and the blender jar 10 is fully received within the housing 102. As the articulating arm 182 moves to the disengaged position D along the path as indicated by arrow B, the push member 212 will inversely move to impart an outward lateral force in the direction as indicated by arrow C on the jar base 26 of the blender jar 10 to aid in the ejection of the blender jar 10 from the jar receiving portion 112. Further, as biased by the biasing member 188 to the engaged position E, the articulating arm 182 imparts a constant force on the base portion 26 and engagement tab 30 of the blender jar 10. Again, the ramped surface 32 of the engagement tab 30 allows the blender jar 10 to slide around the rounded innermost portion 205 of the latch 200, for a snap-fit engagement of the latch member 200 with the engagement tab 30 without the need for the user to separately move the articulating arm 182 to the disengaged position D. Further, this snap-fit engagement provides the user with tactile feedback that the blender jar 10 is properly received within the jar receiving portion 112 and is properly seated on the support pad 110 for consistent and efficient translation of torque through the magnetic coupling system 150.

Figure 6:
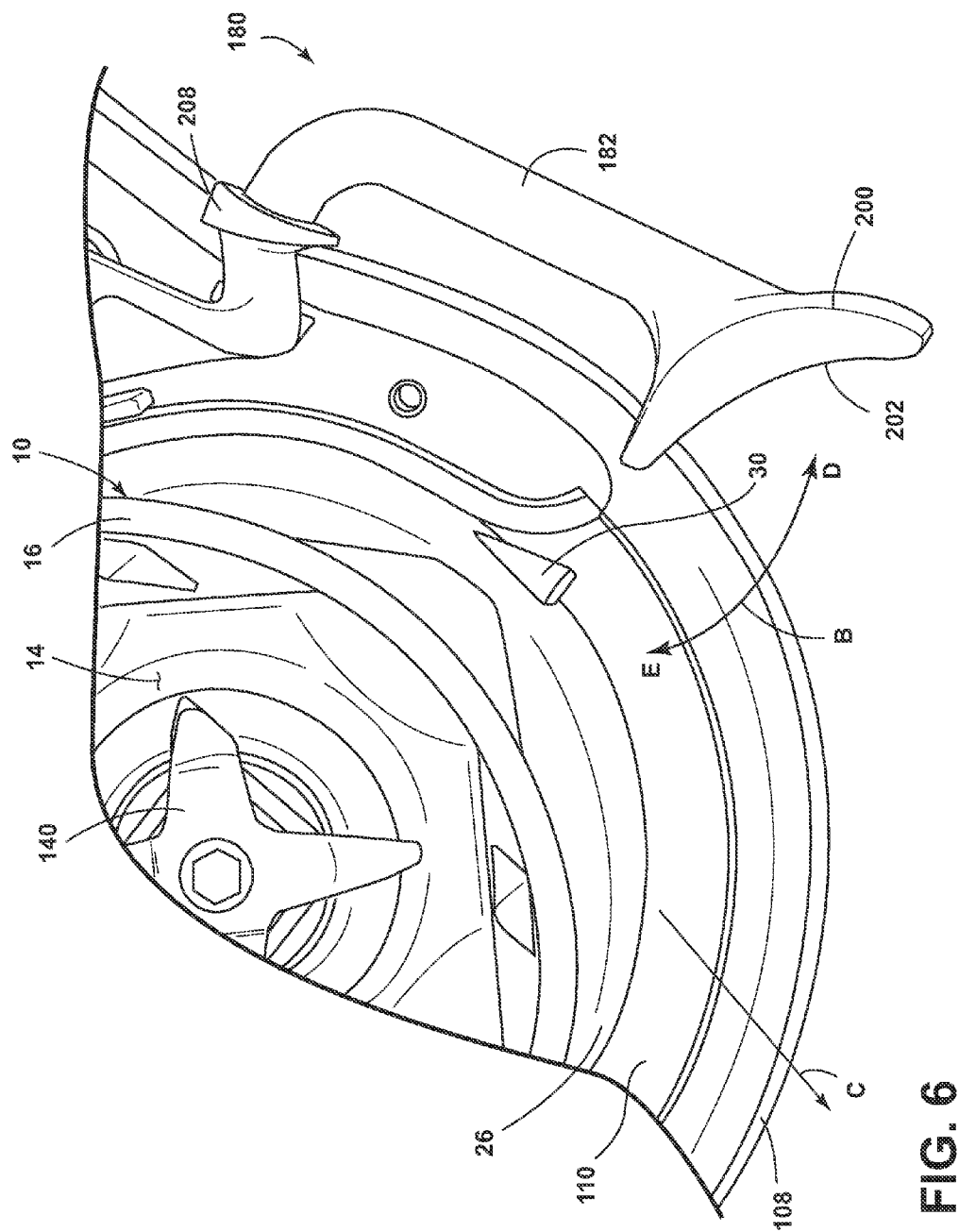
FIG. 6 is a top perspective view of the blender jar and anti-rotational latch mechanism of FIG. 5 with the anti-rotational latch mechanism in an unlatched position.

Referring now to FIG. 5, the jar retainer mechanism 180 is shown with the articulating arm 182 in the engaged position E, such that the latch member 200 is engaged with the engagement tab 30 in a manner as described above. When a user wishes to release the blender jar 10 from the retainer mechanism 180, the user will generally engage the ramped surface 202 of the latch member 200 to pivot the articulating arm 182 towards the disengaged position D along a path as indicated by arrow B. In this way, the latch member 200 moves laterally from the engaged position E to release the blender jar 10. With reference to FIG. 6, the jar retainer mechanism 180 is shown with the articulating arm 182 pivoted to the disengaged position D along the path as indicated by arrow B. As shown in FIG. 6, the latch member 200 of the articulating arm 182 is laterally spaced apart from the engagement tab 30 disposed on the jar base 26 of the blender jar 10. Further, as noted above, when moved to the disengaged position D, the push member 212, shown in FIG.

4B, will urge the blender jar 10 at the jar base 26 outwardly in a direction as indicated by arrow C. In this way, the jar retainer mechanism 180 serves to retain the blender jar 10 in an in-use position when the articulating arm 182 is in the engaged position E, and further aids in the release of the blender jar 10 from the jar receiving portion 112 via the push member 212 when the articulating arm 182 is moved to the disengaged position D.

It will be understood that any described processes or steps within described processes may be combined with other disclosed processes or steps to form structures within the scope of the present concept. The exemplary structures and processes disclosed herein are for illustrative purposes and are not to be construed as limiting.

It is also to be understood that variations and modifications can be made on the aforementioned structures and methods without departing from the concepts of the present concept, and further it is to be understood that such concepts are intended to be covered by the following claims unless these claims by their language expressly state otherwise.

What is claimed is:

1. A jar retainer mechanism for a blending appliance, comprising:
    a housing having an upper housing member and a base portion with a jar receiving portion defined therebetween;
    a blender jar configured to be laterally received in the jar receiving portion, the blender jar having an engagement tab disposed on a jar base portion, wherein the engagement tab includes a ramped surface and an abutment surface; and
    an articulating arm coupled to the base portion of the housing and operable between engaged and disengaged positions, wherein the articulating arm includes a latch member configured to engage the engagement tab of the blender jar when the articulating arm is in the engaged position.

2. The jar retainer mechanism of claim 1, wherein the latch member includes an abutment portion configured to be in abutting engagement with the abutment surface of the engagement tab when the blender jar is received in the jar receiving portion.

3. The jar retainer mechanism of claim 2, further comprising:
    a biasing mechanism coupled to the articulating arm and configured to bias the articulating arm towards the engaged position.

4. The jar retainer mechanism of claim 3, wherein the biasing mechanism comprises a coil spring further coupled to the base portion of the housing.

5. The jar retainer mechanism of claim 1, wherein the jar includes an open upper end having a first configuration and a lower portion having a second configuration, and further wherein the second configuration is varied relative to the first configuration.

6. The jar retainer mechanism of claim 5, wherein the first configuration comprises a teardrop shape, and the second configuration comprises a rectangular shape.

7. A jar retainer mechanism for a blending appliance, comprising:
    an articulating arm pivotally coupled to a housing of said blending appliance, the articulating arm operable between engaged and disengaged positions relative to a blender jar as received within the housing;
    a latch member disposed on a first end of the articulating arm, the latch member configured to engage an engagement tab disposed on the blender jar when the articulating arm is in the engaged position; and
    a push member disposed on a second end of the articulating arm, the push member configured to displace the blender jar when the articulating arm is moved towards the disengaged position.

8. The jar retainer mechanism of claim 7, wherein the engagement tab extends outwardly from a jar base portion of the blender jar.

9. The jar retainer mechanism of claim 8, wherein the engagement tab includes a ramped surface and an abutment surface, wherein the ramped surface is configured to engage the latch member as the blender jar is laterally received within the housing, and further wherein the engagement of the ramped surface of the engagement tab and the latch member urges the articulating arm towards the disengaged position.

10. The jar retainer mechanism of claim 9, wherein the latch member includes an abutment portion configured to be in abutting engagement with the abutment surface of the engagement tab when the blender jar is received in the housing of the blending appliance.

11. The jar retainer mechanism of claim 10, further comprising:
    a biasing mechanism coupled to the articulating arm and configured to bias the articulating arm towards the engaged position.

12. The jar retainer mechanism of claim 11, wherein the biasing mechanism provides for a snap-fit engagement between the articulating arm and the engagement tab.

13. The jar retainer mechanism of claim 7, wherein the push member is configured to laterally displace the blender jar away from the housing as the articulating arm is moved towards the disengaged position.

14. The jar retainer mechanism of claim 13, wherein the latch member and the push member are disposed on opposite sides of the articulating arm with a pivot axis of the articulating arm disposed therebetween.

15. A jar retainer mechanism for a blending appliance, comprising:
    a housing having an upper housing member and a support pad with a jar receiving portion defined therebetween;
    a blender jar having a jar base portion with an outwardly extending engagement tab, the blender jar configured to be laterally received in the jar receiving portion;
    an articulating arm coupled to the base portion of the housing and operable between engaged and disengaged positions, wherein the articulating arm includes a latch member configured to engage the engagement tab of the blender jar when the articulating arm is in the engaged position; and
    a magnetic coupling system having upper and lower magnetic couplers, wherein the upper magnetic coupler is disposed in the base portion of the blender jar and the lower magnetic coupler is disposed in the base portion of the housing.

16. The jar retainer mechanism of claim 15, wherein the blender jar is vertically retained by upper housing member at an open upper end of the blender jar and further retained by the support pad at the jar base portion of the blender jar when the jar is received in the jar receiving portion of the housing.

17. The jar retainer mechanism of claim 16, wherein the blender jar is rotationally retained by the engagement of the engagement tab of the blender jar and the latch member of the articulating arm when the articulating arm is in the engaged position and the blender jar is received in the jar receiving portion.

18. The jar retainer mechanism of claim 17, further comprising:
- a push member disposed on an opposite end of the articulating arm relative to the latch member, the push member configured to displace the blender jar when the articulating arm is moved towards the disengaged position.

19. The jar retainer mechanism of claim 18, wherein the articulating arm is pivotally coupled to the base portion of the housing, and further wherein the latch member and the push member are disposed on opposite sides of a pivot axis of the articulating arm.

* * * * *